(12) United States Patent
Rong et al.

(10) Patent No.: US 9,977,663 B2
(45) Date of Patent: May 22, 2018

(54) TECHNOLOGIES FOR OPTIMIZING SPARSE MATRIX CODE WITH FIELD-PROGRAMMABLE GATE ARRAYS

(71) Applicant: Intel Corporation, Santa Clara, CA (US)

(72) Inventors: Hongbo Rong, San Jose, CA (US); Gilles A. Pokam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 15/200,053

(22) Filed: Jul. 1, 2016

(65) Prior Publication Data
US 2018/0004496 A1    Jan. 4, 2018

(51) Int. Cl.
*G06F 9/45* (2006.01)

(52) U.S. Cl.
CPC .............. *G06F 8/443* (2013.01); *G06F 8/447* (2013.01); *G06F 8/452* (2013.01)

(58) Field of Classification Search
CPC .................................. G06F 8/451; G06F 8/452
See application file for complete search history.

(56) References Cited

U.S. PATENT DOCUMENTS

| 7,840,914 | B1* | 11/2010 | Agarwal | G06F 8/451 716/102 |
| 8,074,210 | B1* | 12/2011 | Jones | G06F 17/16 717/151 |
| 8,250,507 | B1* | 8/2012 | Agarwal | G06F 8/451 716/110 |
| 8,572,590 | B2* | 10/2013 | Lethin | G06F 8/452 717/143 |
| 9,489,343 | B2* | 11/2016 | Bakos | G06F 17/16 |
| 9,558,156 | B1* | 1/2017 | Bekas | G06F 17/16 |
| 9,626,155 | B2* | 4/2017 | Cammarota | G06F 8/00 |

(Continued)

OTHER PUBLICATIONS

Prasanna, Viktor K., and Gerald R. Morris. "Sparse matrix computations on reconfigurable hardware." Computer 40.3 (2007). (Year: 2007).*

(Continued)

*Primary Examiner* — Matthew J Brophy
(74) *Attorney, Agent, or Firm* — Barnes & Thornburg LLP

(57) ABSTRACT

Technologies for optimizing sparse matrix code include a target computing device having a processor and a field-programmable gate array (FPGA). A compiler identifies a performance-critical loop in a sparse matrix source code and generates optimized executable code, including processor code and FPGA code. The target computing device executes the optimized executable code, using the processor for the processor code and the FPGA for the FPGA code. The processor executes a first iteration of the loop, generates reusable optimization data in response to executing the first iteration, and stores the reusable optimization data in a shared memory. The FPGA accesses the optimization data in the shared memory, executes additional iterations of the loop, and optimizes the additional iterations of the loop based on the optimization data. The optimization data may include, for example, loop-invariant data, reordered data, or alternate data storage representations. Other embodiments are described and claimed.

22 Claims, 6 Drawing Sheets

(56) References Cited

U.S. PATENT DOCUMENTS

| | | | |
|---|---|---|---|
| 9,720,663 B2* | 8/2017 | Rong | G06F 8/41 |
| 2004/0123280 A1* | 6/2004 | Doshi | G06F 8/433 |
| | | | 717/161 |
| 2010/0306300 A1* | 12/2010 | Lu | G06F 17/16 |
| | | | 708/520 |
| 2014/0108481 A1* | 4/2014 | Davis | G06F 17/16 |
| | | | 708/607 |
| 2015/0378696 A1* | 12/2015 | Boehm | G06F 8/45 |
| | | | 717/149 |
| 2016/0140084 A1* | 5/2016 | Daga | G06F 17/16 |
| | | | 708/207 |
| 2016/0378442 A1* | 12/2016 | Rong | G06F 8/41 |
| | | | 717/140 |

OTHER PUBLICATIONS

Kapre, Nachiket, and AndréDeHon. "Parallelizing sparse matrix solve for SPICE circuit simulation using FPGAs." Field-Programmable Technology, 2009. FPT 2009. International Conference on. IEEE, 2009. (Year: 2009).*

Cheng S, Wawrzynek J. High level synthesis with a dataflow architectural template. arXiv preprint arXiv:1606.06451. Jun. 21, 2016. (Year: 2016).*

* cited by examiner

```
8 : while true
9 :    old_rz = rz
10:    Ap = SpMV(CSR_A, p)
11:    α = old_rz/(pᵀ * Ap)
12:    x = x + α * p
13:    r = r - α * Ap
14:    if norm(r)/normr0 < tolerance
15:       break
16:    end
17:    z = fwdTriSolve(L, r, L_TDG)
18:    z = bwdTriSolve(Lᵀ, z, LT_TDG)
19:    p = z + (rz/old_rz) * p
20: end
```

FIG. 7

TECHNOLOGIES FOR OPTIMIZING SPARSE MATRIX CODE WITH FIELD-PROGRAMMABLE GATE ARRAYS

BACKGROUND

High-performance computing (HPC) performed on large sparse matrices has become an increasingly important area of computing. Field programmable gate arrays (FPGAs) are computer processing circuits that include configurable logical blocks, data interconnects, and other programmable digital logic resources. FPGAs may be used to accelerate sparse matrix processing as compared to traditional central processing units (CPUs) and/or graphics processing units (GPUs). FPGA designs may be manually selected to accelerate frequently used sparse kernels such as sparse matrix vector multiply (SpMV), triangular solvers, or other kernels. FPGA accelerators may only exist for well-understood sparse kernels. Additionally, manually designed FPGA accelerators may not consider the context of when the kernel is invoked.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is a pseudocode diagram illustrating optimized sparse matrix FPGA code that may be generated and/or executed by a computing device of FIGS. 1-2.

DETAILED DESCRIPTION OF THE DRAWINGS

Figure 1:
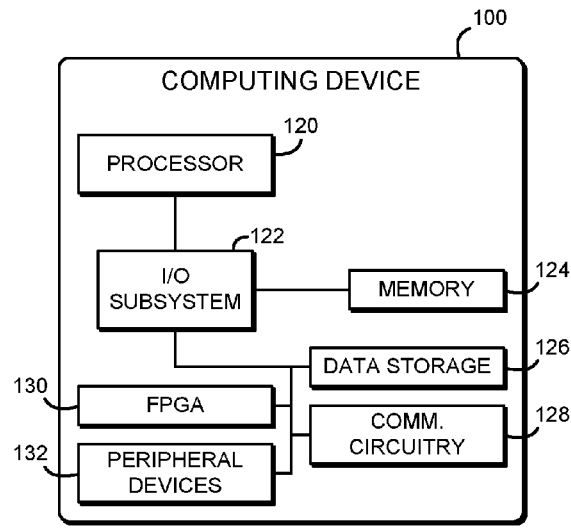
FIG. 1 is a simplified block diagram of at least one embodiment of a computing device for optimizing sparse matrix code.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for generating and/or optimizing sparse matrix source code includes a processor 120 and a field-programmable gate array (FPGA) 130. In use, as described further below, a compiler computing device 100*a* may compile sparse matrix source code into optimized sparse matrix code that includes processor code and FPGA code. A target computing device 100*b* may execute the optimized code. The processor code executes the first iteration of a performance-critical loop with the processor 120 and generates reusable optimization data. The FPGA code executes the remaining iterations of the loop with the FPGA 130. The FPGA 130 accesses the reusable optimization data, which may improve performance. Thus, the computing device 100 may automatically generate FGPA accelerators for a sparse matrix algorithm without requiring manual FPGA design or optimization. Additionally, the computing device 100 may allow for optimized performance of sparse matrix applications without requiring the FPGA 130 to generate the optimization data, which may significantly simplify the FPGA 130. Although described as compiling the code with a compiler computing device 100*a* and executing the code with a target computing device 100*b*, it should be understood that in some embodiments the same computing device 100 may compile and execute the sparse matrix code. Additionally or alternatively, in some embodiments the sparse matrix source code may be compiled by a compiler computing device with differing components, for example by a computing device that does not include an FPGA 130.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 122, a memory 124, a data storage device 126, a communication subsystem 128, and a field-programmable gate array (FPGA) 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Thus, the processor 120 may include multiple hardware threads, logical processors, cores, or other execution contexts capable of executing concurrently. The memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

The FPGA 130 may be embodied as an integrated circuit including programmable digital logic resources that may be configured after manufacture, for example by a system integrator or end user. The FPGA 130 may include, for example, a configurable array of logic blocks in communication over a configurable data interchange. The FPGA 130 may access data stored in the memory 124, for example using a local buffer of the FPGA 130. In some embodiments, the FPGA 130, the processor 120, and/or the memory 124 may be incorporated in the same package and/or in the same computer chip, for example in the same system-on-a-chip (SoC). Additionally or alternatively, the FPGA 130 may be embodied as a discrete component separate from the processor 120 and/or the memory 124.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
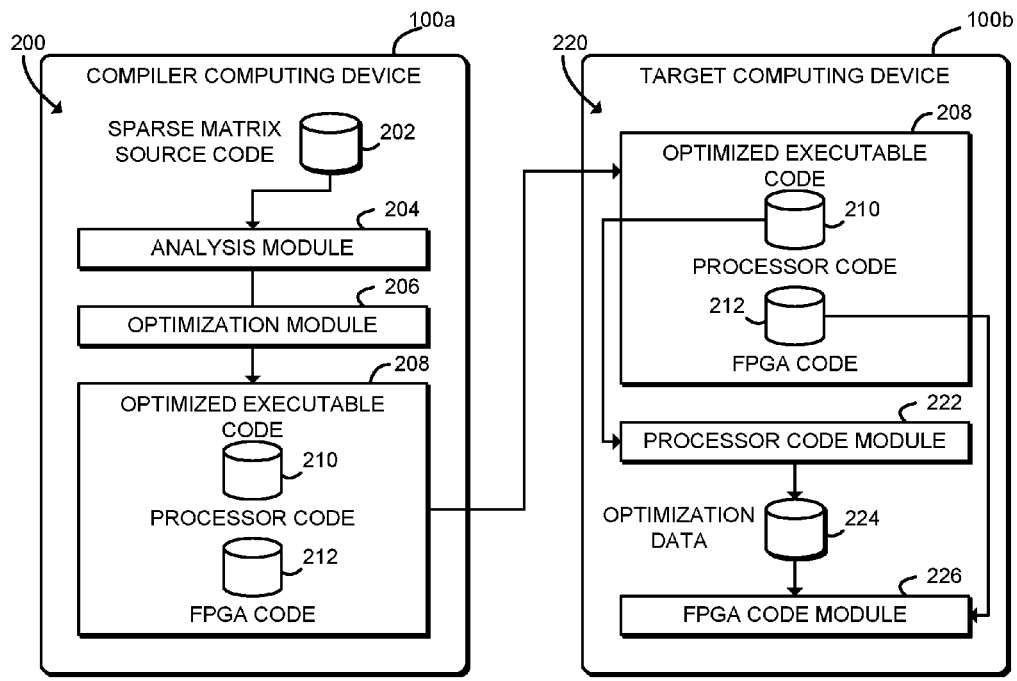
FIG. 2 is a simplified block diagram of various environments that may be established by one or more computing devices of FIG. 1.

Referring now to FIG. 2, in an illustrative embodiment, the compiler computing device 100a establishes an environment 200 during operation. The illustrative environment 200 includes an analysis module 204 and an optimization module 206. The various modules of the environment 200 may be embodied as hardware, firmware, software, or a combination thereof. As such, in some embodiments, one or more of the modules of the environment 200 may be embodied as circuitry or collection of electrical devices (e.g., analysis circuitry 204 and/or optimization circuitry 206). It should be appreciated that, in such embodiments, one or more of the analysis circuitry 204 and/or the optimization circuitry 206 may form a portion of one or more of the processor 120, the I/O subsystem 122, and/or other components of the compiler computing device 100a. Additionally, in some embodiments, one or more of the illustrative modules may form a portion of another module and/or one or more of the illustrative modules may be independent of one another.

The analysis module 204 is configured to identify a performance-critical loop in a sparse matrix source code 202. The sparse matrix source code 202 may be embodied as any application, program, library, module, or other source code that includes one or more sparse matrix algorithms or other sparse matrix operations. The sparse matrix source code 202 may include computer code written in a standard programming language such as C++ or OpenCL.

The optimization module 206 is configured to generate optimized executable code 208 for the sparse matrix source code 202. The optimized executable code 208 includes processor code 210 and field-programmable gate array (FPGA) code 212. The processor code 210 may be embodied as any binary code, bytecode, intermediate representation, or other code that may be executed by or further compiled to be executed by the processor 120 of the target computing device 100b. Similarly, the FPGA code 212 may be embodied as any bitstream, intermediate representation, or other code that may be executed by or further compiled to be executed by the FPGA 130 of the target computing device 100b.

The processor code 210 is configured to cause the processor 120 of the target computing device 100b to execute a first iteration of the performance-critical loop and generate reusable optimization data of the performance-critical loop. The reusable optimization data may include, for example, loop-invariant data of the performance-critical loop, a task dependence graph of the performance-critical loop, a reordered matrix or a reordered vector, a storage representation of a matrix having improved storage efficiency, and/or a maximized structure to contain all non-zeros of a sparse matrix. The processor code 210 may be further configured to cause the processor 120 to store the reusable optimization data in a shared memory 124 of the target computing device 100b.

FPGA code 212 is configured to cause the FPGA 130 of the target computing device 100b to execute one or more additional iterations of the performance-critical loop and optimize the additional iterations of the loop based on the reusable optimization data. The FPGA code 212 may be further configured to cause the FPGA 130 to access the reusable optimization data in the shared memory 124 of the target computing device 100b.

Still referring to FIG. 2, in the illustrative embodiment, the target computing device 100b establishes an environment 220 during operation. The illustrative environment 220 includes a processor code module 222 and an FPGA code module 226. The various modules of the environment 220 may be embodied as hardware, firmware, software, or a combination thereof. As such, in some embodiments, one or more of the modules of the environment 220 may be embodied as circuitry or collection of electrical devices (e.g., processor code circuitry 222 and/or FPGA code circuitry 226). It should be appreciated that, in such embodiments, one or more of the processor code circuitry 222 and/or the FPGA code circuitry 226 may form a portion of one or more of the processor 120, the I/O subsystem 122, the FPGA 130, and/or other components of the target computing device 100b. Additionally, in some embodiments, one or more of the illustrative modules may form a portion of another module and/or one or more of the illustrative modules may be independent of one another.

The processor code module 222 is configured to execute, by the processor 120, a first iteration of a loop of the sparse matrix executable code 208. The processor code module 222 is further configured to generate, by the processor 120, reusable optimization data 224 of the loop in response to executing the first iteration of the loop. The processor code module 222 is further configured to store, by the processor 120, the reusable optimization data 224 in a shared memory 124 of the target computing device 100b. Generating the reusable optimization data 224 may include generating loop-invariant data of the loop. The reusable optimization data 224 may be embodied as, for example, a task dependence graph of the loop, a reordered matrix or a reordered vector, a storage representation of a matrix having improved storage efficiency, and/or a maximized structure to contain all non-zeros of a sparse matrix The FPGA code module 226 is configured to access, by the FPGA 130, the reusable optimization data 224 in the shared memory 124 of the target computing device 100b. The FPGA code module 226 is further configured to execute, by the FPGA 130, one or more additional iterations of the loop of the sparse matrix executable code 208 and to optimize, by the FPGA 130, the additional iterations of the loop based on the reusable optimization data 224.

Although illustrated as being established by a separate compiler computing device 100a and target computing device 100b, it should be understood that in some embodiments some or all of the environments 200, 220 may be established by the same computing device 100. For example, in some embodiments the sparse matrix source code 202 may be compiled to optimized executable code 208 and the optimized executable code 208 may be executed by the same computing device 100.

Figure 3:
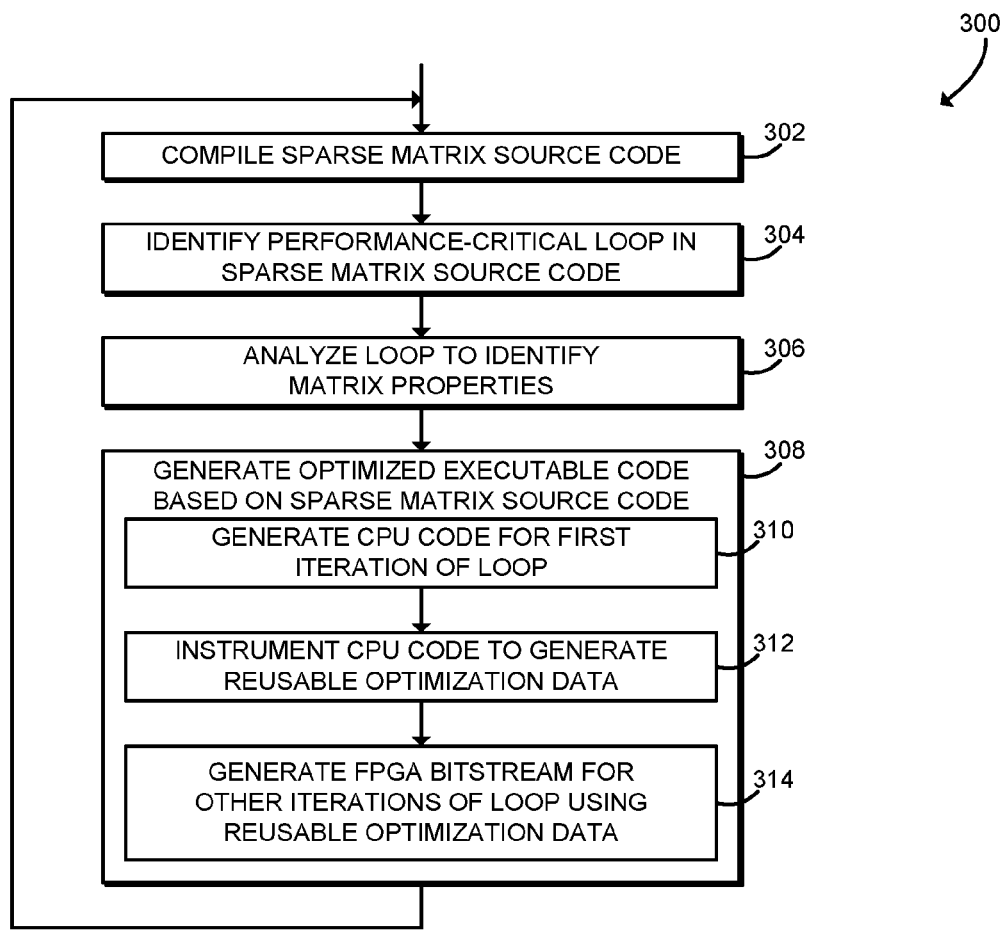
FIG. 3 is a simplified flow diagram of at least one embodiment of a method for compiling sparse matrix source code that may be executed by a computing device of FIGS. 1-2.

Referring now to FIG. 3, in use, the compiler computing device 100a may execute a method 300 for compiling sparse matrix code. It should be appreciated that, in some embodiments, the operations of the method 300 may be performed by one or more modules of the environment 200 of the compiler computing device 100a as shown in FIG. 2. Additionally or alternatively, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 124, the data storage device 126, other memory or data storage devices of the computing device 100, portable media readable by a peripheral device of the computing device 100, and/or other media.

The method 300 begins in block 302, in which the compiler computing device 100a compiles sparse matrix source code 202. The sparse matrix source code 202 may be embodied as any application, program, library, module, or other source code that includes one or more sparse matrix algorithms or other sparse matrix operations. The compiler computing device 100a may compile the sparse matrix source code 202 using a compiler for a standard programming language such as C++ or OpenCL. As further described below, compilation may include parsing, analyzing, optimizing, generating output code, or other compiler steps.

In block 304, the compiler computing device 100a identifies a performance-critical loop in the sparse matrix source code 202. The performance-critical loop may include any loop operating on sparse matrix data or performing a sparse matrix algorithm that the compiler determines to be performance-critical. In block 306, the compiler computing device 100a analyzes the performance-critical loop to identify matrix properties of the sparse matrix source code 202. In particular, the compiler computing device 100a may determine what optimizations may be made to the performance-critical loop, including identifying optimization data 224 that may be re-used between loop iterations, identifying matrices and vectors that could be reordered for improved data locality, or other matrix properties.

In block 308, the compiler computing device 100a generates optimized executable code 208 based on the sparse matrix source code 202. As described further below in connection with FIG. 4, the optimized executable code 208 may be executed by the target computing device 100b. Of course, in some embodiments the compiler computing device 100a and the target computing device 100b may be the same computing device 100. The optimized executable code 208 includes code to be executed by both the processor 120 and the FPGA 130 of the target computing device 100b.

In block 310, the compiler computing device 100a generates processor code 210 for the first iteration of the performance-critical loop. In some embodiments, the processor code 210 may also include one-time setup code to be executed prior to executing the first iteration of the performance-critical loop and/or one-time teardown code to be executed after executing all iterations of the performance-critical loop. In block 312, the compiler computing device 100a instruments the processor code 210 to generate reusable optimization data 224. The compiler computing device 100a may, for example, generate code to reorder data and/or generate loop-invariant data that may be reused in future iterations of the performance-critical loop executed by the FPGA 130. In particular, the compiler computing device 100a may include code to generate a task-dependence graph for dynamic scheduling on the FPGA 130, reordered matrices and vectors for improved data locality, matrices having a more efficient storage representation for the particular matrix algorithms (e.g., compressed sparse row (CSR) for sparse matrix-vector (SpMV) multiply), or maximized structures that are able to contain all possible non-zeros of a sparse matrix during execution. The reusable optimization data 224 may be stored in one or more locations in the memory 124 that are accessible to both the processor 120 and the FPGA 130 of the target computing device 100b.

In block 314, the compiler computing device 100a generates the FPGA code 212, which may be embodied as an FGPA bitstream for the remaining iterations of the performance-critical loop. The FPGA code 212 uses the reusable optimization data 224 to optimize performance of the performance-critical loop. For example, output code may cause the FPGA 130 to access loop-invariant data, reordered matrices and vectors, or other optimization data 224 from the memory 124 during execution of the remaining iterations of the performance-critical loop. After generating the optimized executable code 208, the method 300 loops back to block 302, in which additional sparse matrix source code 202 may be compiled.

Figure 4:
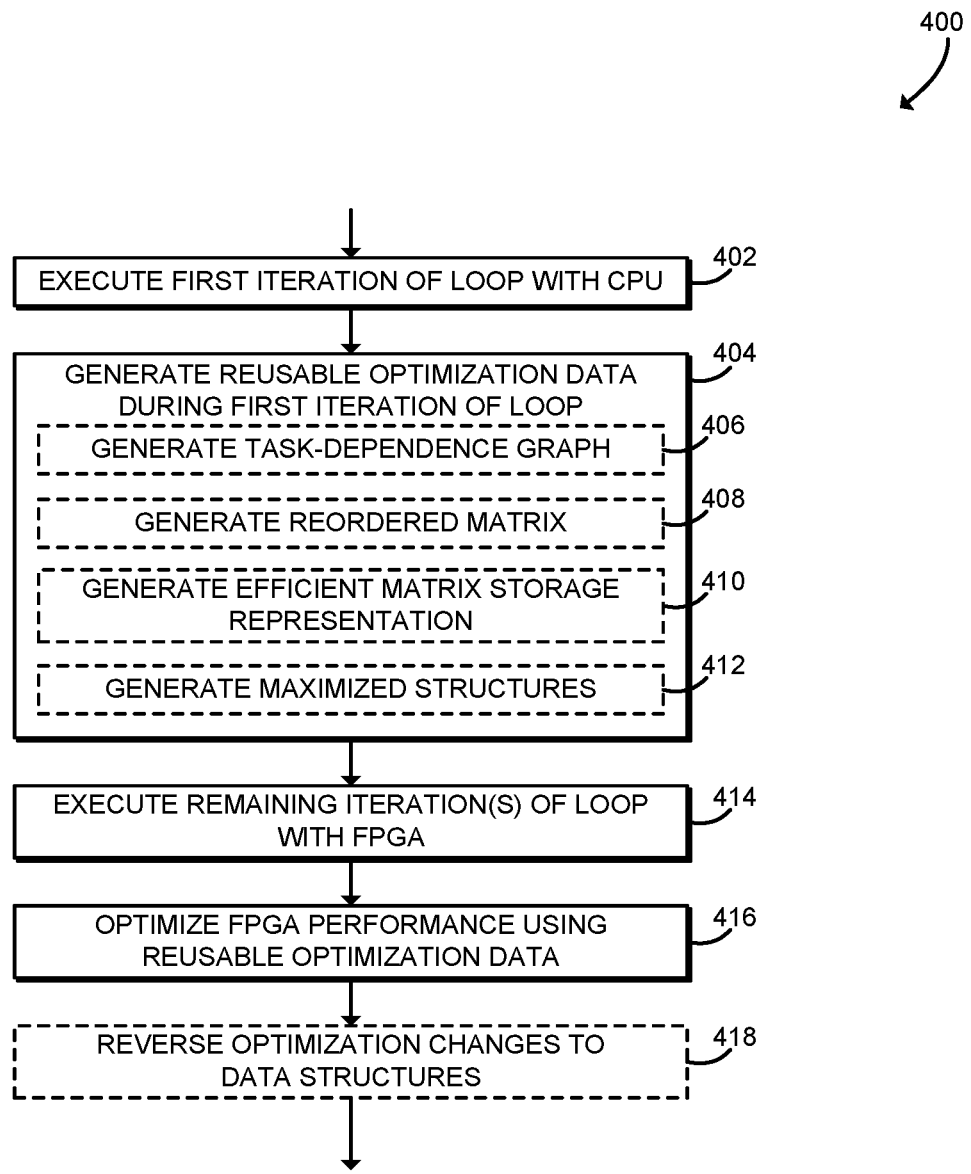
FIG. 4 is a simplified flow diagram of at least one embodiment of a method for executing optimized sparse matrix code with a field-programmable gate array (FPGA) that may be executed by a computing device of FIGS. 1-2.

Referring now to FIG. 4, in use, the target computing device 100b may execute a method 400 for executing optimized sparse matrix code. It should be appreciated that, in some embodiments, the operations of the method 400 may be performed by one or more modules of the environment 220 of the target computing device 100b as shown in FIG. 2. Additionally or alternatively, in some embodiments, the method 400 may be embodied as various instructions stored on a computer-readable media, which may be executed by the processor 120, the FPGA 130, and/or other components of the computing device 100 to cause the computing device 100 to perform the method 400. The computer-readable media may be embodied as any type of media capable of being read by the computing device 100 including, but not limited to, the memory 124, the data storage device 126, other memory or data storage devices of the computing device 100, portable media readable by a peripheral device of the computing device 100, and/or other media.

The method 400 may be executed by the target computing device 100b during execution of optimized executable code 208. As described above in connection with the method of FIG. 3, the compiler computing device 100a may compile the sparse matrix source code 202 to generate the optimized executable code 208. The optimized executable code 208 includes processor code 210, executable by the processor 120 of the target computing device 100b, as well as FPGA code 212, executable by the FPGA 130 of the target computing device 100b. The target computing device 100b may receive the optimized executable code 208 via a network connection or may otherwise be provisioned with the optimized executable code 208. Of course, as described above in some embodiments, the optimized executable code 208 may be compiled and executed by the same computing device 100. The target computing device 100b may execute the method 400 in response to reaching a performance-critical loop in the optimized executable code 208.

The method 400 begins in block 402, in which the target computing device 100b executes the first iteration of a loop using the processor 120. To execute the first iteration, the target computing device 100b may execute, for example, the processor code 210 of the optimized executable code 208. In some embodiments, the target computing device 100b may also execute one-time setup code using the processor 120 prior to entering the loop. In block 404, the target computing device 100b generates reusable optimization data 224 during execution of the first iteration of the loop (or during execution of one-time setup code prior to entering the loop). The target computing device 100b may, for example, reorder data and/or generate loop-invariant data that may be reused in future iterations of the loop executed by the FPGA 130. The reusable optimization data 224 may be stored in one or more locations in the memory 124 that are accessible to both the processor 120 and the FPGA 130. In some embodiments, in block 406 the target computing device 100b may generate a task-dependence graph for dynamic scheduling on the FPGA 130. In some embodiments, in block 408 the target computing device 100b may generate one or more reordered matrices and/or vectors for improved data locality. In some embodiments, in block 410 the target computing device 100b may generate one or more matrices having a more efficient storage representation for the particular matrix algorithms (e.g., compressed sparse row (CSR) for sparse matrix-vector (SpMV) multiply). In some embodiments, in block 412, the target computing device 100b may generate maximized structures that are able to contain all possible non-zeros of a sparse matrix during execution.

In block 414, the target computing device 100b executes one or more remaining iterations of the loop using the FPGA 130. To execute the remaining iterations, the target computing device 100b may execute, for example, the FPGA code 212 of the optimized executable code 208. In block 416, the target computing device 100b optimizes FPGA performance using the reusable optimization data 224 to optimize performance of the performance critical loop. For example, the FPGA 130 may access loop-invariant data, reordered matrices and vectors, or other optimization data 224 from the memory 124 while executing the remaining iterations of the performance-critical loop. Because the FPGA 130 accesses the optimization data 224 in the memory 124, the FPGA 130 does not need to include circuitry or other logic resources to generate the optimization data 224 itself.

In some embodiments, in block 418 the target computing device 100b may reverse any optimization changes made to data structures such as matrices and vectors. For example, the target computing device 100b may restore any matrices or vectors that were reordered to their original ordering and/or may restore matrices to their original representation format. The target computing device 100b may reverse optimization changes, for example, by executing one-time teardown code with the processor 120 after exiting the loop. After executing the remaining iterations of the loop and in some embodiments reversing optimization changes, the method 400 is completed. The method 400 may continue to be executed in response to encountering additional performance-critical loops in the optimized executable code 208.

Figure 5:
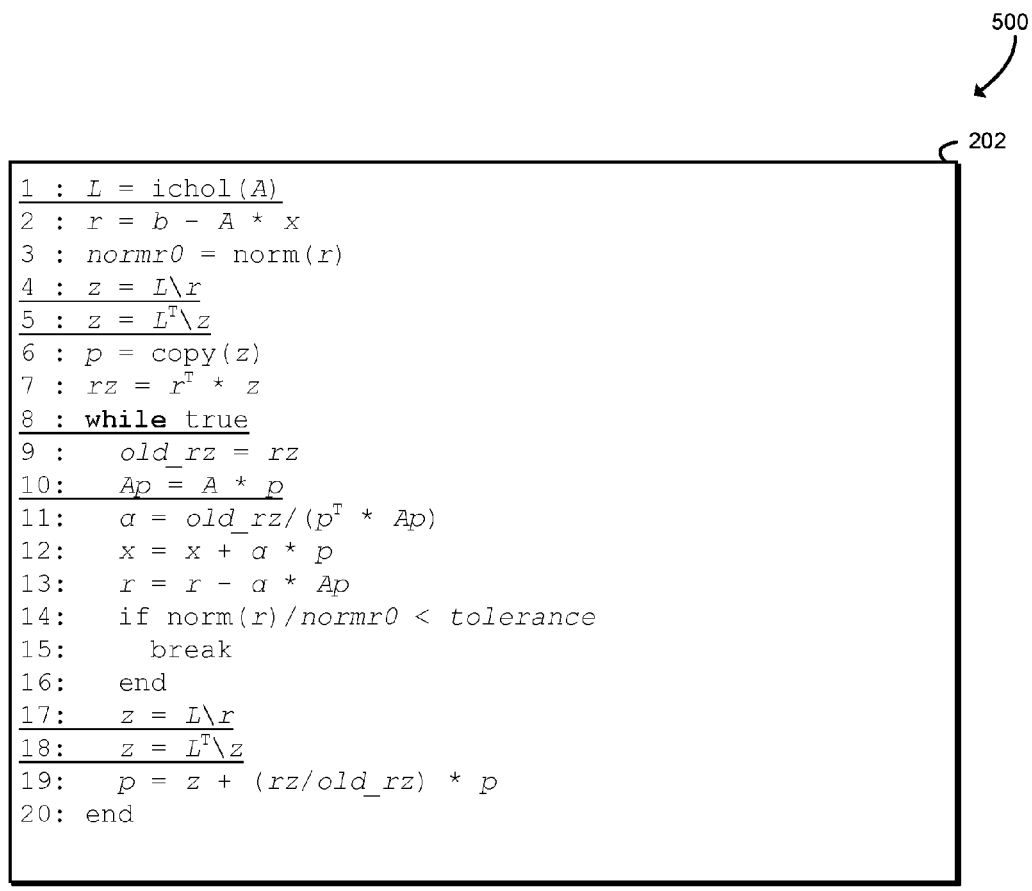
FIG. 5 is a pseudocode diagram illustrating sparse matrix source code that may be compiled by a computing device of FIGS. 1-2.

Referring now to FIG. 5, pseudocode diagram 500 illustrates one potential embodiment of sparse matrix source code 202 that may be compiled and optimized by a computing device 100. The diagram 500 includes preconditioned conjugate gradient (PCG) as an illustrative sparse matrix algorithm. As described above in connection with block 306, various matrix properties of the source code 202 may be discovered during compilation. Illustratively, in line 1, the compiler may determine that matrix A must be symmetric and the returned structure L must be the lower triangle of A based on meta-data of the library call to ichol (incomplete Cholesky factorization). Also, the compiler may determine that a task-dependence graph (TDG) can be built for ichol( ) so that ichol( ) internally runs in parallel. The compiler may identify iterative code (i.e., a performance-critical loop) starting at line 8. Due to the structural relationship between L and A, the compiler may further determine that L and $L^T$ can reuse part of A's TDG for lines 4, 5, 17, and 18. For the sparse matrix-vector multiply (SpMV) operation in line 10, the compiler may determine, using metadata, that CSR representation is more efficient than compressed sparse column (CSC) representation, and the compiler may determine that matrix reordering may improve performance.

Figure 6:
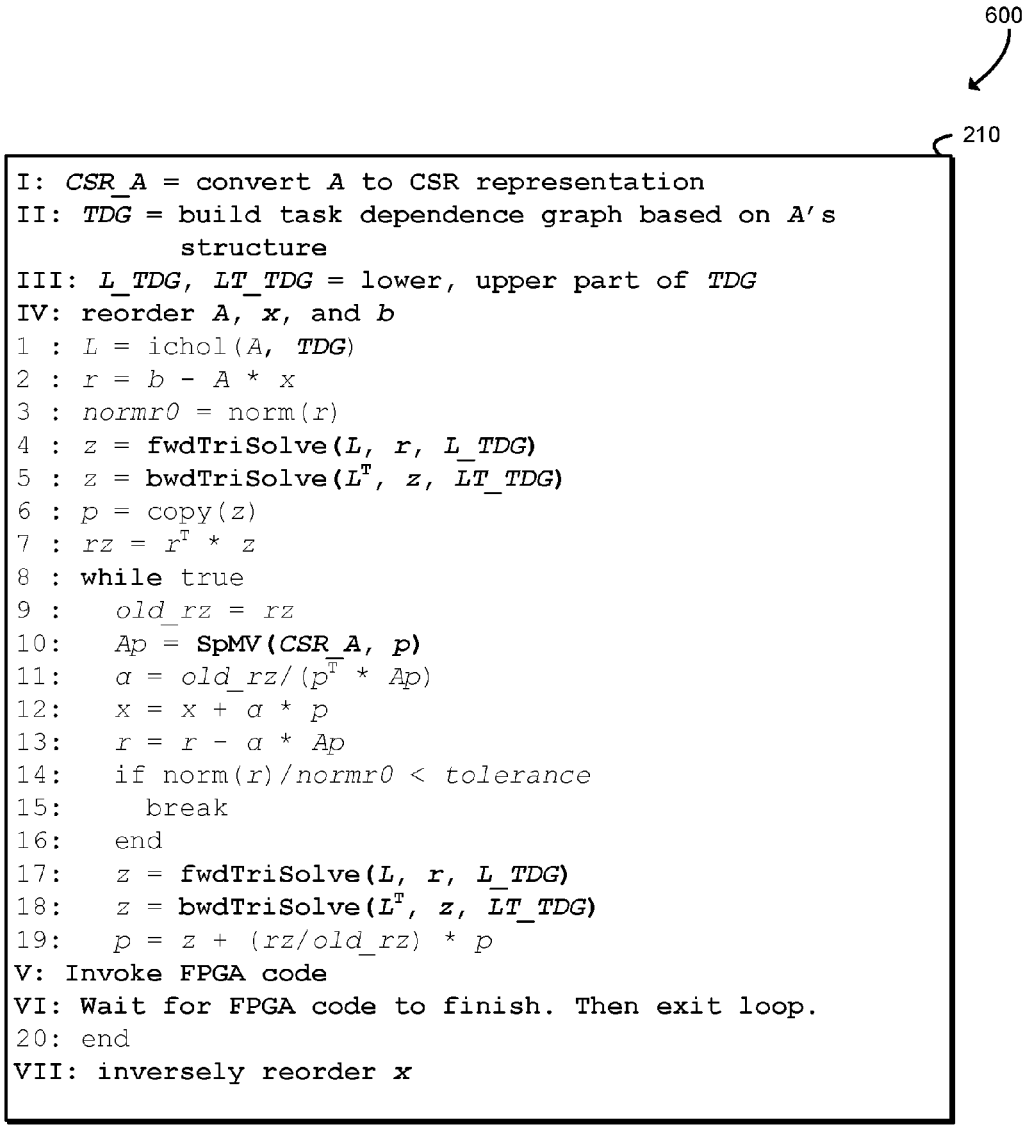
FIG. 6 is a pseudocode diagram illustrating optimized sparse matrix processor code that may be generated and/or executed by a computing device of FIGS. 1-2.

Referring now to FIG. 6, pseudocode diagram 600 illustrates one potential embodiment of processor code 210 that may be generated based on the sparse matrix source code 202 of FIG. 5. As shown, in the processor code 210, the major matrix/vector operations have been converted to calls to a high-performance library (such as the call to SpMV in line 10 and the calls to forward and backward triangular solvers fwdTriSolve and bwdTriSolve in lines 4, 5, 17, and 18). The processor code 210 also includes code inserted to generate optimization data 224, illustrated in lines I through VII. In line I, the inserted code converts matrix A to the CSR representation CSR_A, which may improve performance In lines II and III, the inserted code generates a task dependence graph TDG based on A's structure, and lets L and $L^T$ share parts of that TDG. In line IV, the inserted code reorders the inputs A, x, and b. The results generated by the inserted code are stored into the shared memory 124 as the reusable optimization data 224. The reusable optimization data 224 is used as input to the high-performance library calls, as shown in lines 1, 4-5, 10, and 17-18. At the end of the first loop iteration, in lines V and VI the compiler has inserted code to invoke the FPGA code 212 and wait for the FPGA code 212 to finish processing and then exit the loop and proceed to line VII. After the FPGA 212 code is finished, the compiler has inserted code in line VII to inversely reorder the output x, which reverses the reordering that was performed in line IV. Although illustrated as waiting for the FPGA code 212 to complete, it should be understood that in some embodiments the processor code 210 may end immediately after passing execution to the FPGA code 212 or may continue executing other tasks in parallel.

Referring now to FIG. 7, pseudocode diagram 700 illustrates one potential embodiment of FPGA code 212 that may be generated based on the sparse matrix source code 202 of FIG. 5. As described above in connection with FIG. 6, the FGPA code 212 may be executed after the first invocation of the loop is completed. As shown in FIG. 7, the FPGA code 212 performs the same operations as the processor code 210, except the FPGA code 212 does not include code to generate the reusable optimization data 224. Instead, the FPGA code 212 reads the reusable optimization data 224 directly from the shared memory 124. The generated FPGA code 212 may include components to perform sparse matrix operations like SpMV, TriSolve (triangular solver), waxpby, and task scheduler, which may be synthesized by the compiler from FPGA component libraries. These components are invoked when the FPGA code 212 runs. The FPGA components may communicate with the shared memory 124 through a buffer. As described above, all of the reusable optimization data 224 are stored in the shared memory 124. The FPGA components may also store local results to the FPGA local memory.

EXAMPLES

Illustrative examples of the technologies disclosed herein are provided below. An embodiment of the technologies may include any one or more, and any combination of, the examples described below.

Example 1 includes a computing device for optimizing sparse matrix code, the computing device comprising: an analysis module to identify a performance-critical loop in a sparse matrix source code; and an optimization module to generate optimized executable code for the sparse matrix source code, wherein the optimized executable code includes processor code and field-programmable gate array (FPGA) code, wherein: the processor code is to cause a processor of a target computing device to (i) execute a first iteration of the performance-critical loop and (ii) generate reusable optimization data of the performance-critical loop in response to execution of the first iteration; and the FPGA code is to cause an FPGA of the target computing device to (i) execute one or more additional iterations of the performance-critical loop and (ii) optimize the one or more additional iterations of the loop based on the reusable optimization data.

Example 2 includes the subject matter of Example 1, and wherein the reusable optimization data comprises loop-invariant data of the performance-critical loop.

Example 3 includes the subject matter of any of Examples 1 and 2, and wherein: the processor code is further to cause the processor to store the reusable optimization data in a shared memory of the target computing device; and the FPGA code is further to cause the FPGA to access the reusable optimization data in the shared memory of the target computing device.

Example 4 includes the subject matter of any of Examples 1-3, and wherein to generate the reusable optimization data comprises to generate a task dependence graph of the performance-critical loop.

Example 5 includes the subject matter of any of Examples 1-4, and wherein to generate the reusable optimization data comprises to generate a reordered matrix or a reordered vector.

Example 6 includes the subject matter of any of Examples 1-5, and wherein to generate the reusable optimization data comprises to generate a storage representation of a matrix having improved storage efficiency.

Example 7 includes the subject matter of any of Examples 1-6, and wherein to generate the reusable optimization data comprises to generate a maximized structure to contain all non-zeros of a sparse matrix.

Example 8 includes a computing device for optimizing sparse matrix code, the computing device comprising: a processor; a field-programmable gate array (FPGA); a processor code module to (i) execute, by the processor, a first iteration of a loop of a sparse matrix executable code, (ii) generate, by the processor, reusable optimization data of the loop in response to execution of the first iteration of the loop, and (iii) store, by the processor, the reusable optimization data in a shared memory of the computing device; and an FPGA code module to (i) access, by the FPGA, the reusable optimization data in the shared memory of the computing device, (ii) execute, by the FPGA, one or more additional iterations of the loop of the sparse matrix executable code, and (iii) optimize, by the FPGA, the one or more additional iterations of the loop based on the reusable optimization data in response to accessing of the reusable optimization data.

Example 9 includes the subject matter of Example 8, and wherein to generate the reusable optimization data comprises to generate loop-invariant data of the loop.

Example 10 includes the subject matter of any of Examples 8 and 9, and wherein to generate the reusable optimization data comprises to generate a task dependence graph of the loop.

Example 11 includes the subject matter of any of Examples 8-10, and wherein to generate the reusable optimization data comprises to generate a reordered matrix or a reordered vector.

Example 12 includes the subject matter of any of Examples 8-11, and wherein to generate the reusable optimization data comprises to generate a storage representation of a matrix having improved storage efficiency.

Example 13 includes the subject matter of any of Examples 8-12, and wherein to generate the reusable optimization data comprises to generate a maximized structure to contain all non-zeros of a sparse matrix.

Example 14 includes a method for optimizing sparse matrix code, the method comprising: identifying, by a computing device, a performance-critical loop in a sparse matrix source code; and generating, by the computing device, optimized executable code for the sparse matrix source code, wherein the optimized executable code includes processor code and field-programmable gate array (FPGA) code, wherein: the processor code is to cause a processor of a target computing device to (i) execute a first iteration of the performance-critical loop and (ii) generate reusable optimization data of the performance-critical loop in response to execution of the first iteration; and the FPGA code is to cause an FPGA of the target computing device to (i) execute one or more additional iterations of the performance-critical loop and (ii) optimize the one or more additional iterations of the loop based on the reusable optimization data.

Example 15 includes the subject matter of Example 14, and wherein the reusable optimization data comprises loop-invariant data of the performance-critical loop.

Example 16 includes the subject matter of any of Examples 14 and 15, and wherein: the processor code is further to cause the processor to store the reusable optimization data in a shared memory of the target computing device; and the FPGA code is further to cause the FPGA to access the reusable optimization data in the shared memory of the target computing device.

Example 17 includes the subject matter of any of Examples 14-16, and wherein to generate the reusable optimization data comprises to generate a task dependence graph of the performance-critical loop.

Example 18 includes the subject matter of any of Examples 14-17, and wherein to generate the reusable optimization data comprises to generate a reordered matrix or a reordered vector.

Example 19 includes the subject matter of any of Examples 14-18, and wherein to generate the reusable optimization data comprises to generate a storage representation of a matrix having improved storage efficiency.

Example 20 includes the subject matter of any of Examples 14-19, and wherein to generate the reusable optimization data comprises to generate a maximized structure to contain all non-zeros of a sparse matrix.

Example 21 includes a method for optimizing sparse matrix code, the method comprising: executing, by a processor of a computing device, a first iteration of a loop of a sparse matrix executable code; generating, by the processor of the computing device, reusable optimization data of the loop in response to executing the first iteration of the loop; storing, by the processor of the computing device, the reusable optimization data in a shared memory of the computing device; accessing, by a field-programmable gate array (FPGA) of the computing device, the reusable optimization data in the shared memory of the computing device; executing, by the FPGA of the computing device, one or more additional iterations of the loop of the sparse matrix executable code; and optimizing, by the FPGA of the computing device, the one or more additional iterations of the loop based on the reusable optimization data in response to accessing the reusable optimization data.

Example 22 includes the subject matter of Examples 21, and wherein generating the reusable optimization data comprises generating loop-invariant data of the loop.

Example 23 includes the subject matter of any of Examples 21 and 22, and wherein generating the reusable optimization data comprises generating a task dependence graph of the loop.

Example 24 includes the subject matter of any of Examples 21-23, and wherein generating the reusable optimization data comprises generating a reordered matrix or a reordered vector.

Example 25 includes the subject matter of any of Examples 21-24, and wherein generating the reusable optimization data comprises generating a storage representation of a matrix having improved storage efficiency.

Example 26 includes the subject matter of any of Examples 21-25, and wherein generating the reusable optimization data comprises generating a maximized structure to contain all non-zeros of a sparse matrix.

Example 27 includes a computing device comprising: a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for optimizing sparse matrix code, the computing device comprising: means for identifying a performance-critical loop in a sparse matrix source code; and means for generating optimized executable code for the sparse matrix source code, wherein the optimized executable code includes processor code and field-programmable gate array (FPGA) code, wherein: the processor code is to cause a processor of a target computing device to (i) execute a first iteration of the performance-critical loop and (ii) generate reusable optimization data of the performance-critical loop in response to execution of the first iteration; and the FPGA code is to cause an FPGA of the target computing device to (i) execute one or more additional iterations of the performance-critical loop and (ii) optimize the one or more additional iterations of the loop based on the reusable optimization data.

Example 31 includes the subject matter of Example 30, and wherein the reusable optimization data comprises loop-invariant data of the performance-critical loop.

Example 32 includes the subject matter of any of Examples 30 and 31, and wherein: the processor code is further to cause the processor to store the reusable optimization data in a shared memory of the target computing device; and the FPGA code is further to cause the FPGA to access the reusable optimization data in the shared memory of the target computing device.

Example 33 includes the subject matter of any of Examples 30-32, and wherein to generate the reusable optimization data comprises to generate a task dependence graph of the performance-critical loop.

Example 34 includes the subject matter of any of Examples 30-33, and wherein to generate the reusable optimization data comprises to generate a reordered matrix or a reordered vector.

Example 35 includes the subject matter of any of Examples 30-34, and wherein to generate the reusable optimization data comprises to generate a storage representation of a matrix having improved storage efficiency.

Example 36 includes the subject matter of any of Examples 30-35, and wherein to generate the reusable optimization data comprises to generate a maximized structure to contain all non-zeros of a sparse matrix.

Example 37 includes a computing device for optimizing sparse matrix code, the computing device comprising: means for executing, by a processor of the computing device, a first iteration of a loop of a sparse matrix executable code; means for generating, by the processor of the computing device, reusable optimization data of the loop in response to executing the first iteration of the loop; means for storing, by the processor of the computing device, the reusable optimization data in a shared memory of the computing device; means for accessing, by a field-programmable gate array (FPGA) of the computing device, the reusable optimization data in the shared memory of the computing device; means for executing, by the FPGA of the computing device, one or more additional iterations of the loop of the sparse matrix executable code; and means for optimizing, by the FPGA of the computing device, the one or more additional iterations of the loop based on the reusable optimization data in response to accessing the reusable optimization data.

Example 38 includes the subject matter of Example 37, and wherein the means for generating the reusable optimization data comprises means for generating loop-invariant data of the loop.

Example 39 includes the subject matter of any of Examples 37 and 38, and wherein the means for generating the reusable optimization data comprises means for generating a task dependence graph of the loop.

Example 40 includes the subject matter of any of Examples 37-39, and wherein the means for generating the reusable optimization data comprises means for generating a reordered matrix or a reordered vector.

Example 41 includes the subject matter of any of Examples 37-40, and wherein the means for generating the reusable optimization data comprises means for generating a storage representation of a matrix having improved storage efficiency.

Example 42 includes the subject matter of any of Examples 37-41, and wherein the means for generating the reusable optimization data comprises means for generating a maximized structure to contain all non-zeros of a sparse matrix.

The invention claimed is:

1. A computing device for optimizing sparse matrix code, the computing device comprising: an analysis module to identify a performance-critical loop in a sparse matrix source code; and an optimization module to generate optimized executable code for the sparse matrix source code, wherein the optimized executable code includes processor code and field-programmable gate array (FPGA) code, wherein: the processor code is to cause a processor of a target computing device to (i) execute a first iteration of the performance-critical loop and (ii) generate reusable optimization data of the performance-critical loop in response to execution of the first iteration; and the FPGA code is to cause an FPGA of the target computing device to (i) execute one or more additional iterations of the performance-critical loop and (ii) optimize the one or more additional iterations of the loop based on the reusable optimization data.

2. The computing device of claim 1, wherein the reusable optimization data comprises loop-invariant data of the performance-critical loop.

3. The computing device of claim 1, wherein: the processor code is further to cause the processor to store the reusable optimization data in a shared memory of the target computing device; and the FPGA code is further to cause the FPGA to access the reusable optimization data in the shared memory of the target computing device.

4. The computing device of claim 1, wherein to generate the reusable optimization data comprises to generate a task dependence graph of the performance-critical loop.

5. The computing device of claim 1, wherein to generate the reusable optimization data comprises to generate a reordered matrix or a reordered vector.

6. The computing device of claim 1, wherein to generate the reusable optimization data comprises to generate a storage representation of a matrix having improved storage efficiency.

7. The computing device of claim 1, wherein to generate the reusable optimization data comprises to generate a maximized structure to contain all non-zeros of a sparse matrix.

8. One or more non-transitory computer-readable storage media comprising a plurality of instructions that in response to being executed cause a computing device to: identify a performance-critical loop in a sparse matrix source code; and generate optimized executable code for the sparse matrix source code, wherein the optimized executable code includes processor code and field-programmable gate array (FPGA) code, wherein: the processor code is to cause a processor of a target computing device to (i) execute a first iteration of the performance-critical loop and (ii) generate reusable optimization data of the performance-critical loop in response to execution of the first iteration; and the FPGA code is to cause an FPGA of the target computing device to (i) execute one or more additional iterations of the performance-critical loop and (ii) optimize the one or more additional iterations of the loop based on the reusable optimization data.

9. The one or more computer-readable storage media of claim 8, wherein the reusable optimization data comprises loop-invariant data of the performance-critical loop.

10. The one or more computer-readable storage media of claim 8, wherein: the processor code is further to cause the processor to store the reusable optimization data in a shared memory of the target computing device; and the FPGA code is further to cause the FPGA to access the reusable optimization data in the shared memory of the target computing device.

11. The one or more computer-readable storage media of claim 8, wherein to generate the reusable optimization data comprises to generate a task dependence graph of the performance-critical loop.

12. The one or more computer-readable storage media of claim 8, wherein to generate the reusable optimization data comprises to generate a reordered matrix or a reordered vector.

13. A computing device for optimizing sparse matrix code, the computing device comprising: a processor; a field-programmable gate array (FPGA); a processor code module to (i) execute, by the processor, a first iteration of a loop of a sparse matrix executable code, (ii) generate, by the processor, reusable optimization data of the loop in response to execution of the first iteration of the loop, and (iii) store, by the processor, the reusable optimization data in a shared memory of the computing device; and an FPGA code module to (i) access, by the FPGA, the reusable optimization data in the shared memory of the computing device, (ii) execute, by the FPGA, one or more additional iterations of the loop of the sparse matrix executable code, and (iii) optimize, by the FPGA, the one or more additional iterations of the loop based on the reusable optimization data in response to accessing of the reusable optimization data.

14. The computing device of claim 13, wherein to generate the reusable optimization data comprises to generate loop-invariant data of the loop.

15. The computing device of claim 13, wherein to generate the reusable optimization data comprises to generate a task dependence graph of the loop.

16. The computing device of claim 13, wherein to generate the reusable optimization data comprises to generate a reordered matrix or a reordered vector.

17. The computing device of claim 13, wherein to generate the reusable optimization data comprises to generate a storage representation of a matrix having improved storage efficiency.

18. The computing device of claim 13, wherein to generate the reusable optimization data comprises to generate a maximized structure to contain all non-zeros of a sparse matrix.

19. One or more non-transitory computer-readable storage media comprising a plurality of instructions that in response to being executed cause a computing device to: execute, by a processor of the computing device, a first iteration of a loop of a sparse matrix executable code; generate, by the processor of the computing device, reusable optimization data of the loop in response to executing the first iteration of the loop; store, by the processor of the computing device, the reusable optimization data in a shared memory of the computing device; access, by a field-programmable gate array (FPGA) of the computing device, the reusable optimization data in the shared memory of the computing device; execute, by the FPGA of the computing device, one or more additional iterations of the loop of the sparse matrix executable code; and optimize, by the FPGA of the computing device, the one or more additional iterations of the loop based on the reusable optimization data in response to accessing the reusable optimization data.

20. The one or more computer-readable storage media of claim 19, wherein to generate the reusable optimization data comprises to generate loop-invariant data of the loop.

21. The one or more computer-readable storage media of claim 19, wherein to generate the reusable optimization data comprises to generate a task dependence graph of the loop.

22. The one or more computer-readable storage media of claim 19, wherein to generate the reusable optimization data comprises to generate a reordered matrix or a reordered vector.

* * * * *